Patented Nov. 27, 1934

1,982,486

UNITED STATES PATENT OFFICE 1,982,486

RESIN AND METHOD OF MAKING THE SAME

Paul F. Schlingman, Schenectady, N. Y., assignor to General Electric Company, a corporation of New York No Drawing. Application April 30, 1929, Serial No. 359,433

7 Claims. (Cl. 260—130)

This invention relates to the production of a new and improved resin and the method of making the same.

When an aromatic amine, such as aniline, is caused to react in acid solution with an excess of formaldehyde and the solution is neutralized by means of an alkali, a product is obtained which when dried is an amorphous substance. This product may be subjected to heat and compression and thus molded into various shapes with or without fillers. The preparation of such a product is outlined in the British patent to the Society of Chemical Industry in Basle, No. 284,589, dated September 13, 1928.

The aniline formaldehyde resin, prepared as outlined, lacks flow when molded as in molded compound practice. The resin so prepared, when molded at pressures of 2000 pounds per square inch or above, and at temperatures of 150° C. and above, does not lend itself easily to the formation of various shapes. Only the most simple shapes, such as flat strips, blocks, etc., can be successfully made, and this is particularly so when this resin is incorporated with various types of fillers. Since molding materials require fillers both from an economical and mechanical standpoint this property of flow is important in a resin used in molding work.

I have found that I can produce a satisfactory resin of the type referred to which will be a more easily moldable compound. I accomplish this desirable end by substituting amino compounds of the aromatic series which constitute a larger space arrangement in the molecule than aniline, as for example, amines having a phenyl linkage exemplified by benzidine.

In carrying out my invention I use compounds, such as the di-phenyl amines, benzidine, and the like, in place of aniline. With these I can use an aldehyde such as formaldehyde, acetaldehyde and furfural, and prepare the resin. As an example of my invention I cite the following:—

Using benzidine as an example of an amine having a larger space arrangement in the molecule than aniline, I employ the following formula;—

1. 1 mol. hydrochloric acid
   1 mol. benzidine
   2000 cc. water.
2. 1.1 mols. aldehyde (formaldehyde)
3. 1.0 mols. of a base or its equivalent
   1000 cc. water Solution No. 2 is added to solution No. 1 at a temperature below the boiling point of the aldehyde. In some instances, depending upon the amine used, the heat of reaction produced by the addition of solution 2 to solution 1 must be controlled so as not to exceed 40° C. After this solution has been allowed to stand for one hour or more, solution No. 3 is added with vigorous stirring until the neutralization is complete. The resulting precipitate is then freed from electrolytes and dried.

The resin prepared this way may be incorporated with fillers and a moldable compound is secured which will flow very easily at temperatures considerably below 150° C. and as low as 100° C., and at pressures as low as 400–500 pounds per square inch, which will be seen is a marked improvement over the resin as prepared in accordance with the specification of the British patent.

If an aldehyde content of less than 1.1 mols. be employed for each mol. of amine used, the resulting resinous product is the so-called "A" stage product; that is, additional aldehyde, heat, and pressure are required to convert it to the infusible condition. A method for preparing such a "two-stage" resin is described in a copending application of Roy H. Kienle, Serial No. 359,423, filed April 30, 1929, and assigned to the same assignee as the present invention. In either case, the use of amines having a larger space arrangement in the molecule than aniline results in more flexible, more plastic, resinous compositions. It is thus seen that this process provides a method whereby aldehyde-amine resins may be rendered more plastic and flexible, and more easily moldable than has heretofore been the case.

These resins so prepared may be incorporated with resins prepared by the ordinary aniline-formaldehyde condensation either by dry mixing of the finished resin or by mixing the constituents during the process of manufacture. Such practice produces resins exhibiting varying degrees of plasticity and which can be molded over a range of temperatures and pressures varying from 100° C.–200° C., and from little or no pressure to 3000 pounds per square inch, respectively.

As an example of this procedure I mention the following, which shows a method of preparation by mixing the constituents during the process of manufacture of the resin.

1.0 mol. of aniline is mixed with .005 mol. benzidine in a suitable amount of water. 1.01 mols. hydrochloric acid are then added and the temperature of the mixture adjusted. 1.11 mols. of formaldehyde are now added and the mixture allowed to stand for an hour. Sufficient base or its equivalent is then added to the mixture to effect neutralization, after which the precipitate may be separated, washed, dried, etc.

Furthermore, these higher aromatic amines, which I use in accordance with my invention, may be added to the resin prepared by the specification of the British patent, as such, without using additional acid, aldehyde, or neutralizing base to take care of this added amount. This practice must be followed with care to avoid too great an unbalancing of the reacting constituents. In other words, the addition of the higher amines as such, should not exceed more than a few per cent of the total aniline content.

The following will serve as an exampe of this latter procedure:

1 mol. aniline
   1 mol. hydrochloric acid
   1 mol. formaldehyde
   1 mol. base
   3000 cc. water, and
   1/100 mol. benzidine, are used.

The benzidine is merely added along with the other constituents making up the ordinary resin, without any provision being made for any acid, aldehyde, or neutralizing base to take care of this substance. The resin is then prepared as outlined above.

As another example of this procedure, the same formula as above is used substituting 1 mol. of o-toluidine for the aniline. 1/100 mol. benzidine is used as above as the plasticizing agent. The resin obtained has marked flow and is easily worked into various shapes.

What I claim as new and desire to secure by Letters Patent of the United States is:—

1. The process of preparing a resin which consists in treating an aromatic amine of the group consisting of benzidine and diphenylamines, with an aldehyde of the group consisting of aldehydes of the lower fatty acid series and furfural, in a solution of non-oxidizing mineral acid which forms an addition product with the amine, precipitating the condensation product with alkali, and molding said product under heat and pressure.

2. The process of preparing a resin which consists in reacting benzidine in non-oxidizing mineral acid solution with formaldehyde, precipitating the condensation product with alkali, and molding said product under heat and pressure.

3. The process of preparing a resin which consists in reacting 1 mol. of benzidine with 1.1 mols. of formaldehyde in aqueous medium containing 1 mol. of hydrochloric acid, neutralizing with 1 mol. of alkali to precipitate the condensation product, washing said product free from electrolytes, drying, and molding said dried product with fillers under heat and pressure.

4. The method of forming a plastic, moldable condensation product of the aromatic amine-aldehyde type which comprises reacting an amine of the group consisting of benzidine and diphenylamines, in non-oxidizing mineral acid solution, an aldehyde of the group consisting of aldehydes of the lower fatty acid series and furfural to form a condensation product, and neutralizing any excess acid.

5. The process of preparing a resin which consists in reacting aniline and formaldehyde in hydrochloric acid solution in the presence of a relatively small proportion of an aromatic amine of the group consisting of benzidine and diphenylamines, precipitating the condensation product with alkali, and molding said product under heat and pressure.

6. The neutralized product of the condensation in hydrochloric acid solution of an aromatic amine of the group consisting of benzidine and diphenylamines, and an aldehyde of the group consisting of aldehydes of the lower fatty acid series and furfural, which product is rendered infusible under heat and pressure.

7. The neutralized, washed and dried product of the condensation in hydrochloric acid solution of benzidine and formaldehyde which product is easily molded under heat and pressure to the infusible state.

PAUL F. SCHLINGMAN.